United States Patent [19]

Kumlin

[11] Patent Number: 5,630,377
[45] Date of Patent: May 20, 1997

[54] DISPOSABLE PET TOILET ASSEMBLY

[76] Inventor: Robert R. Kumlin, 109 Wexford Dr., Cherry Hill, N.J. 08003

[21] Appl. No.: 533,070

[22] Filed: Sep. 25, 1995

Related U.S. Application Data

[63] Continuation-in-part of Ser. No. 220,829, Mar. 31, 1994, Pat. No. 5,482,007.

[51] Int. Cl.$^6$ ................................................ A01K 29/00
[52] U.S. Cl. ................................................ 119/172
[58] Field of Search ........................... 119/169, 172, 119/171, 165, 706

[56] References Cited

U.S. PATENT DOCUMENTS

| | | | |
|---|---|---|---|
| 2,505,176 | 4/1950 | Elder | 112/262 |
| 2,708,418 | 5/1955 | Sugarman et al. | 119/1 |
| 3,227,137 | 1/1966 | Campbell | 119/1 |
| 3,233,588 | 2/1966 | Thomas | 119/1 |
| 3,486,485 | 12/1969 | Kahanick | 119/706 |
| 3,684,155 | 8/1972 | Smith | 119/1 |
| 3,752,121 | 8/1973 | Brazzell | 119/1 |
| 3,809,013 | 5/1974 | Rigney et al. | 119/1 |
| 3,828,731 | 8/1974 | White | 119/172 |
| 3,990,396 | 11/1976 | Turk | 119/170 |
| 4,279,217 | 7/1981 | Behringer | 119/1 |
| 4,376,422 | 3/1983 | Whitehead et al. | 119/172 |
| 4,534,315 | 8/1985 | Sweeney | 119/165 |
| 4,541,359 | 9/1985 | Hickey et al. | 119/1 |
| 4,706,606 | 11/1987 | Coppola | 119/165 |
| 4,779,566 | 10/1988 | Morris | 119/165 |
| 4,800,677 | 1/1989 | Mack | 119/1 |
| 4,858,559 | 8/1989 | Allen | 119/165 |
| 4,869,204 | 9/1989 | Yananton | 119/165 |
| 4,934,316 | 6/1990 | Mack | 119/1 |
| 5,007,375 | 4/1991 | Paciullo | 119/170 |
| 5,100,600 | 3/1992 | Keller | 264/112 |

FOREIGN PATENT DOCUMENTS

| | | | |
|---|---|---|---|
| 2248785 | 3/1981 | France | 119/171 |

Primary Examiner—Thomas Price
Attorney, Agent, or Firm—Rothwell, Figg, Ernst & Kurz

[57] ABSTRACT

A disposable pet toilet assembly comprising an absorbent material which is deployed in a plurality of strips which are bundled together and caused to stand upright and arrayed to touch each other discontinuously so as to develop friction and therefore provide a soft resilient grasslike texture attractive to animals. In its preferred embodiment, the strips are further attached to an absorbent base sheet and a liquid impermeable membrane liner which prevents soiling and provides a wrapping for the absorbent material for easy disposal. The assembly is designed to be used with a conventional kitty litter box or by itself as a portable and disposable toilet assembly for travelling with a pet.

17 Claims, 8 Drawing Sheets

DISPOSABLE PET TOILET ASSEMBLY

CROSS-REFERENCE TO RELATED APPLICATION

This application is a continuation-in-part of prior U.S. application Ser. No. 08/220,829, filed on Mar. 31, 1994, now U.S. Pat. No. 5,482,007.

BACKGROUND OF THE INVENTION

1. Technical Field

The present invention relates generally to pet toilet units, and more specifically to a completely disposable toilet unit, one aspect of which is that upon becoming sufficiently soiled by liquid and solid waste, the toilet unit can be easily discarded.

2. Description of the Background Art

Many people, especially those in urban environments, must leave their pets indoors for periods of time and the animals are required to eliminate their waste within the enclosed, interior environment. Often this period of time lasts for many days, but most often the time is 10 to 12 hours each day which reflects the period required for full time employment and travel to and from the workplace. Therefore, the need for a better short term and convenient accommodation of animal waste products and their disposal for confined and unattended pets is required.

The well known solution to this problem has been the animal litter box. The basic device is a shallow open container most commonly containing an absorbent granular or pelletized material ("litter"), which material is disposed of periodically as it becomes soiled. Common litter materials include clay, diatomaceous earth, and alfalfa; less common materials include peat, fly ash, cedar chips, and various pelletized materials such as paper, sawdust, and polyethylene foam. There are a number of problems associated with the basic device and its component parts, some of which have been addressed with limited success by various prior refinements.

The utilization of absorbent clay, by far the most commonly used litter material, has a number of problems. It is heavy and inconvenient to use and, in addition to frequent spills, dust is discharged into the air when it is poured into and out of the litterbox. When the box is used, the animal's natural instinct to bury the fecal matter and urine causes it to kick the litter out of the box, raise more airborne dust, and make a mess. Other less popular materials used for litter such as diatomaceous earth and fly ash have the same characteristics. In addition, all of these granular mineral products are unsanitary and are not recommended for use by veterinarians after animal surgery (especially the common claw removal for cats) as they are likely to cause infection. When a permanent litter box with a disposable plastic sheet liner is used (by far the most common assembly for domestic cats), a sufficient depth of granular material must be utilized to protect the liner from tearing due to the digging/burying instinct. This amount of material, in turn, requires the plastic liner to be sturdy enough to lift the material out of the box, thereby making the liner more expensive.

Other pelletized or granular materials made of organically derived byproducts, including pelletized paper, alfalfa, peat, sawdust, et. al., have been suggested to overcome the weight and dust problems of the granular minerals, but the light weight of these products exacerbates the problem of litter scattering and liner tearing, and many of them do not create a desirable texture for the animal to walk upon or utilize as a toilet.

An additional problem with all pelletized litters is the lack of portability. With the increase in mobility of the population, pets are often moved or taken on vacation requiring a portable animal toilet. Having to carry a bag of litter, liner, and litter box and having to set up and dispose of the assembly at a motel is often an exercise in creative logistics and always a serious inconvenience. Mack, U.S. Pat. No. 4,800,077 Jan. 31, 1989, proposes an animal waste collection pad with a frangible capsule which when broken will attract dogs; because of its flat sheet configuration and lack of attractive texture it is not likely to be either noticed or utilized by cats or other animals.

Providing a cover over the litter box has been proposed to eliminate the scattering problem of pelletized litter materials and contain odors, but these boxes are bulky in size and require constant cleaning. Covered boxes do not work well because animals resist going into a small enclosed space for elimination, preferring as open an outdoor space as possible for two reasons: it is the instinctual opposite of denning which prefers a closed space and animals will not soil a den; and, if the container has been previously used, there are always lingering odors which are also a deterrent. In addition, as the waste ages in the confined space, the odor concentration can get intense, and the animal will be less likely to use the container.

Other prior litter box solutions propose various assemblies of parts including, Sweeney, U.S. Pat. No. 4,534,315 (1985) which discloses an assembly wherein nonabsorbent granules are layered over an absorbent layer, and Yahanton, U.S. Pat. No. 4,869,204 (1989) which discloses a three part assembly consisting of a screen to prevent tearing, an absorbent pad, and an impermeable plastic lining all of which is covered by a layer of granular litter. Brazzell, U.S. Pat. No. 3,752,121 is similar to Yahanton except that an impermeable artificial grass is used as a protective layer above the absorbent pad. Other related patents include U.S. Pat. No. 3,233,588 which utilizes a screen above the litter to collect feces and U.S. Pat. No. 3,809,013 which incorporates granular litter and a stack of liners. While many additional patents could be cited regarding other variations of assemblies, none of the known literature satisfactorily addresses the problems of either the portability or the scattering of pelletized litter and/or have not been commercially successful because they are too complex and costly, and require the maintenance and cleaning of the various component parts.

It is common knowledge and practice to use newspaper to house train dogs to eliminate in a chosen area and it is relatively well known that newspaper can be used in a litter box as a substitute for commercially available litter as an expediency. Indeed, the use of torn newspaper for litter is commonly recommended by veterinarians following surgery, so as to avoid the infections caused by granular mineral products entering the wounds. However, the use of newspaper for litter in sheet or torn form has some fundamental problems—In sheet form the litter is not appealing to animals (especially cats) because it surface texture is too smooth and it does not satisfy the digging/burying instinct. In addition, urine tends to stay on the surface as does fecal matter and both are likely to get tracked around the house. In addition, the waste products that are absorbed by the sheets stay wet and are not sufficiently aerated to dry out; the layers between the sheets become breeding grounds for odor causing bacteria and fungi. The sheets are not efficient absorbers of moisture because their exposed surface area is not great.

Tearing the newspaper into strips improves the performance of the newspaper as it increases the absorption area, creates pockets for aeration, and generates a more desirable texture for the animal. However, torn newspaper when laid in a litter box tends to get compressed, tangled, and matted together by the animal excrement. Walking upon it gradually makes it lay flat and it quickly loses most of its desirable characteristics. In addition, when shredded paper is used, it precludes the utilization of a waterproof liner as the digging/burying will cause tears due to the lack of protection which is provided by paper sheets, a sufficient depth of granular material, or (less commonly) protective screens or layers suggested by some of the more complex prior art assemblies cited above.

Torn or shredded paper, particularly absorbent paper such as newsprint has been successfully used as a substitute for straw or shavings for large ruminants such as cattle. It is more absorbent than straw or shavings which contain high percentages of non-absorbent cellulose fibers. However, its use for smaller animals has not been as effective, as the "bedding" when cut into long strips tends to become entangled and matted with excrement. Whitehead et al., U.S. Pat. No. 4,376,422 (1983), attempts to overcome this problem by cutting the paper into strips and varying the length of strips so that much of the material is in the form of diced paper 10 to 40 mm in width and up to 120 mm long. Although this invention claims to prevent tangling, it does not prevent the gradual compression and flattening of the material. Reducing the paper further to a particulate form creates particles which decompose on contact with urine into a pulp or mush which quickly loses its effectiveness. U.S. Pat. No. 5,001,600 attempts to obviate this problem by creating "tubular interlaced pellets" that have integral voids. Both the diced and pelletized paper would, of course, have the same scattering and textural problems mentioned previously if used in a typical open litter box.

It should be noted that the term "bedding" or "animal bedding" is similar in many respects to the term "litter" as they are both materials used to absorb animal waste. In common usage "bedding" is a material used in an animal confinement for both sleeping and absorbing waste products, "litter" is a single use material for waste only and the animal may be confined or not but does not sleep or live on it. For the purposes of the present invention, the words are considered interchangeable.

It is not new to take strips of material and attach them or weave them together to create a textured surface. Indeed, this is the configuration of cut pile carpet and fur-like fabrics. Additional, and perhaps more related applications, can be found including Elder, U.S. Pat. No. 2,505,176 (1950) where an artificial grass mat as a grave decoration is proposed.

The creation of loosely woven absorbent material is described in Charbonneau, French Patent No. 2 248 785 (1975) in which a loose mat of straw is woven with cellulose string to form a litter for ruminants and horses. This prior art, although tangentially applicable to the present invention, has only marginal utility as a pet toilet application. The problem with straw is that it is too messy a material to be utilized in a pet toilet and because of its high cellulose fiber content it is not sufficiently absorbent. If the methodology of construction were replicated utilizing a more suitable material such as shredded newspaper, there would be little improvement over the basic material as it would tend to lay flat and be subject to the matting and caking mentioned previously. Indeed, the only advantage of this material would be the elimination of loose fibers and the ability to gather and fabricate the strip material as a single and portable assembly.

It is common knowledge that a disposable liquid impermeable membrane or liner can be utilized to obviate the cleaning of the rigid permanent litter box container. When granular litter is employed, this plastic liner often doubles as a bag for disposal of the material. This liner can take the form of a simple sheet of plastic (the most common commercially available product) or in a variety of forms including U.S. Pat. No. 5,007,375 (1991), wherein the liner is in the form of a plastic bag which slips over the entire box; Sweeny, U.S. Pat. No. 3,227,137 (1966), wherein the liner is elaborately folded, slips over the box edge and after use becomes a disposal bag; and U.S. Pat. No. 4,779,566 (1988) which is similar to Sweeny, but incorporates a retainer below the lip of the permanent box. There are many other variations, including: Goldman et al., U.S. Pat. No. 3,227,137; Smith, U.S. Pat. No. 3,684,155; and Behringer, U.S. Pat. No. 4,279,217. All of these prior solutions provide an easy disposal method, but all are related to the containment of pelletized or granular litter and require a sturdy plastic to support the weight when the material is disposed of.

SUMMARY OF THE INVENTION

In contrast to the methods, materials and assemblies described above, the disposable pet toilet unit of the present invention provides for a simple, disposable assembly which eliminates the need for pelletized litter and its attendant problems, is attractive to animals, and obviates the cleaning required by more complex assemblies.

The disposable pet toilet of the present invention includes a pet toilet absorbent pad which is comprised of an absorbent fibrous, tufted, or shredded fabrication, which can be fabricated in a great variety of geometries to achieve the same effect, this effect being the creation of a resilient and uniform, soft textured grasslike surface, which gives the animal support while at the same time replicating the feel of soft grass or dirt. The effect is achieved by selective shredding of absorbent sheet materials such as paper and the arrangement of the resultant strips so that the natural longitudinal strength of the strips along with the friction developed along the cut edge is combined to generate the required characteristics. The absorbent pad can be used with or without an absorbent base sheet, which, in its preferred embodiment, is attached to a liquid impermeable membrane liner, which assembly in its preferred embodiment fits into a common permanent litter box and is held in place by restraining means to the litter box. Another preferred embodiment is the same assembly without the litter box which may be used primarily as a portable pet toilet while travelling with a pet. With either embodiment, after the litter is fouled, the entire assembly is wrapped within the liner and disposed of.

Accordingly, several objects and advantages of the present invention are:

To provide a litter material and assembly which cannot be scattered by animals as a result of instinctive digging to bury waste matter;

In the preferred embodiment using recycled newspaper, to utilize recycled material to conserve forests and take advantage of its natural characteristics including high absorption and economy;

To provide a litter material which is lighter in weight than conventional clay and mineral products and is easier to use;

To provide a litter material which by its construction and geometry stands upright and therefore resists matting and entanglement and provides natural cavities for the containment, aeration and evaporative drying of urine and fecal matter;

To provide a litter material which by geometry and arrangement utilizes the natural strength and frictional resistance of the cut edge of absorbent sheet material strips and, by the thus created arching effect, generates a soft and resilient texture similar to grass or dirt to encourage its use by animals, but cannot be scattered;

To provide a more sanitary litter that will not cause infections in open wounds or surgical incisions.

To provide a litter material which is highly absorbent by maximizing the exposed surface by slitting shredding, slicing, and/or geometric configuration and thereby enhancing the naturally absorbent qualities of a material;

To provide a litter that will not generate dust or spills when it is put into the litter box or removed;

To provide an animal litter which is portable, easy to set up, and easily disposed of while travelling with a pet;

To provide a litter that is a one piece assembly which when combined with a plastic liner and inserted into a conventional litter box provides for convenience of use and disposal;

To provide a litter that utilizes existing litter boxes and requires no special equipment to install, clean or utilize;

To provide a litter geometry wherein the natural acts of walking upon and digging by the animal will improve the efficacy of the litter;

To provide a litter assembly which when in combination with an impermeable liner, prevents it from tearing; and To provide a litter which requires no cleaning.

In addition to the objects and advantages cited above, the present invention, in its preferred embodiment, utilizes recycled newspapers. Recycling of newspaper is mandatory in many communities and this practice is increasing. Such paper is usually bundled and commonly available as a cheap bulk commodity. Because of this increased recycling, the amount of waste paper is also increasing and there is an environmental need for reutilizing this material in lieu of other products. Newspapers are printed on highly absorbent paper and in addition, the principal ingredients in newspaper ink are carbon black or lamp black suspended in an oil vehicle: both carbon black and lamp black are natural deodorants, effective in reducing the odors related to absorbed liquids. Therefore, although it is clear that many absorbent natural materials and manufactured products could be utilized in the present invention, recycled newspaper is the presently preferred absorbent material: it has not been utilized extensively for animal litter heretofore, however, because of the other problems enumerated above.

Still further objects and advantages will become apparent from a consideration of the ensuing description and drawings.

DESCRIPTION OF THE DRAWINGS

In the drawings, closely related figures have the same number but different alphabetic suffixes.

FIGS. 6A through 6L and FIGS. 7A through 7J illustrate embodiments that are designed for continuous production utilizing loose shredded absorbent material.

FIGS. 6A through 6D show the steps in the manufacturing a single linear tuft embodiment incorporating shredded absorbent material.

FIG. 6E shows an embodiment where a single tuft along with an absorbent base sheet is used to form the pet toilet absorbent pad assembly.

FIG. 6F shows a partial section at the edge of a multiple tuft pet toilet absorbent pad assembly.

FIG. 6G is an isometric view of a short portion of a single tuft.

FIG. 6H shows a plan and FIG. 6J shows a section of a pet toilet absorbent pad assembly with 5 rows of tufts.

FIG. 6K shows a plan and FIG. 6L shows a section of a pet toilet absorbent pad with 2 rows of tufts.

FIGS. 7A and 7B show the steps of manufacturing a single tuft with a base sheet comprised of a uniform single component compressible material.

FIGS. 7C through 7F show the steps of manufacturing a single tuft with a compound base sheet comprised of a top sheet, a layer of absorbent stuffing, and a bottom sheet.

FIG. 7G shows a partial section at the edge of a multiple tuft pet toilet absorbent pad assembly including a base sheet comprised of a top sheet, a layer of absorbent stuffing, and a bottom sheet.

FIG. 7H is an isometric view of a short portion of a single tuft, including a base sheet comprised of a top sheet, a layer of absorbent stuffing, and a bottom sheet.

FIG. 7J shows an embodiment where a single tuft including a base sheet comprised of a top sheet, a layer of absorbent stuffing, and a bottom sheet is used to form the pet toilet absorbent pad assembly.

DETAILED DESCRIPTION OF THE PREFERRED EMBODIMENTS

Figure 1A:
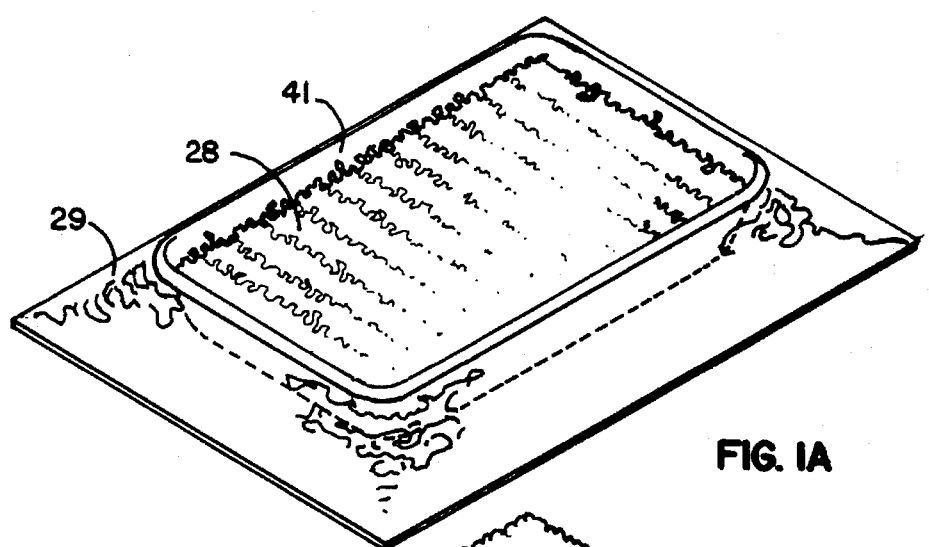
FIG. 1A is a perspective view of the invention, showing the deployment of the embodiment of the pet toilet shown in FIGS. 2A through 2D in a litterbox.
Figure 2D:
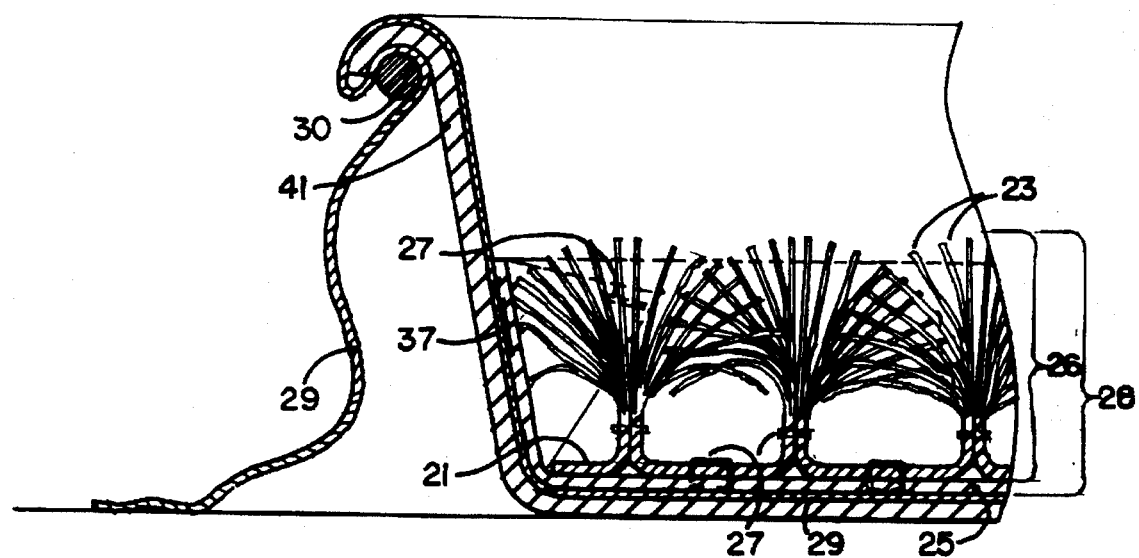
FIG. 2D shows a partial sectional detail of a complete assembly of the embodiment shown in FIGS. 2A, 2B, and 2C.

FIG. 1A shows an overall view of an embodiment in which a pet toilet absorbent pad assembly 28 and a liquid impermeable membrane liner 29 would be inserted in and attached to a conventional litter box 41 by an attachment means 30 (see FIG. 2D for location of attachment means). In the embodiment which is illustrated, the attachment means is an elastic cord 30 which fits under the lip of the litter box and is shown in FIG. 2D, which figure describes in more detail some of the components utilized when the present invention is used with litter box 41.

Figure 1B:
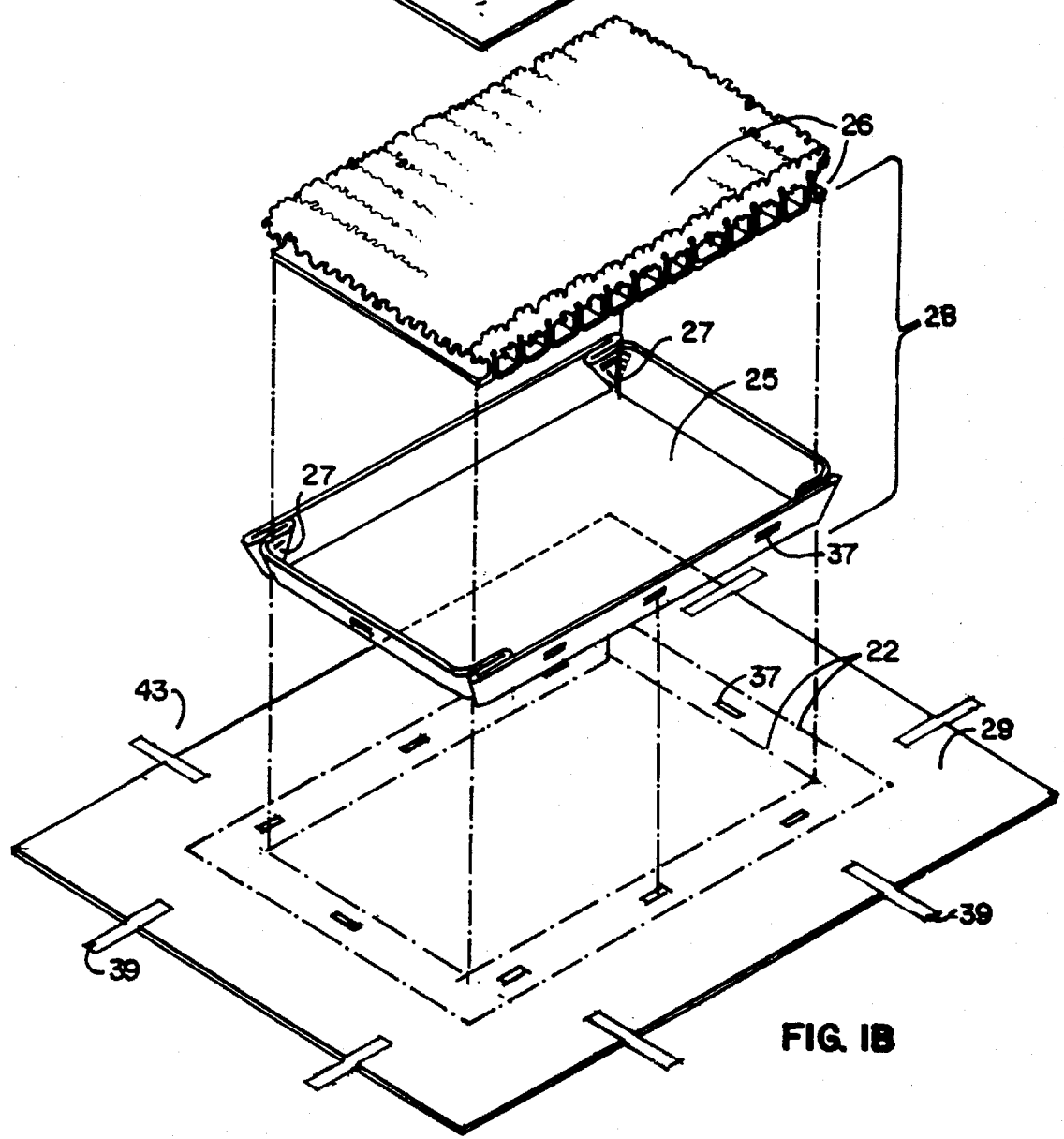
FIG. 1B is an exploded view of the invention illustrated in FIG. 1A.
Figure 2E:
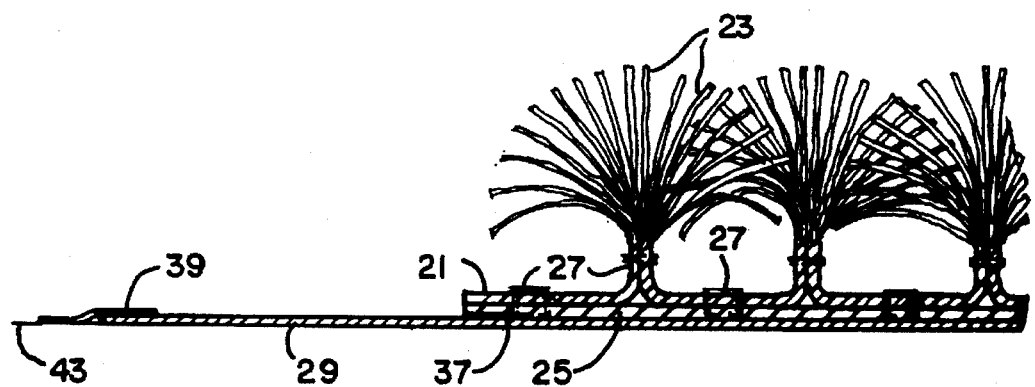
FIG. 2E shows a detail of a complete assembly of an embodiment used with an absorbent base sheet which is not turned up to create a pan and without a litter box.

FIG. 1B shows an exploded view of some of the components of the present invention. A pet toilet absorbent pad 26 is shown in the embodiment shown in FIG. 2D. An absorbent base sheet 25 is shown with the edges turned up and the corners folded and secured by absorbent material attachment means 27, which in this embodiment would be staples or paper tabs. A thus created pet toilet absorbent pad assembly 28 is then attached to a liquid impermeable membrane liner 29 by attachment means 37 at predetermined intervals. In the preferred embodiment, the attachment means would be either an adhesive, two sided adhesive tape, or a mechanical fastener such as a staple. When the alternate embodiment of the present invention is to be utilized for travel without a litter box, the liquid impermeable membrane liner 29 is simply secured to the floor or supporting surface 43 by attachment means 39 at predetermined intervals. FIG. 2E shows another application of use without a litter box; in this application, the edge of absorbent base sheet 25 is not turned up.

Figure 2A:
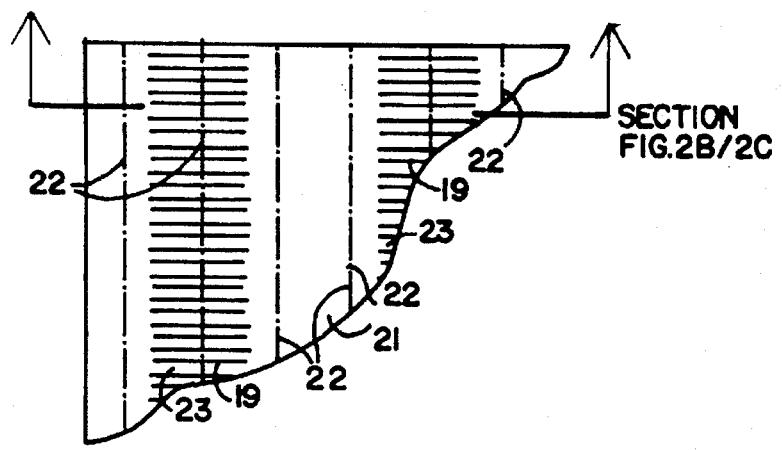
FIG. 2A shows a plan of a portion of the partially slit absorbent sheet material used to fabricate the embodiments illustrated in detail in FIGS. 2B, 2C, 2D and 2E.

FIGS. 2A, 2B, 2C, 2D, and 2E, illustrate one embodiment of the present invention. So that it be made clear by the process of fabrication how the final geometry is achieved, FIG. 2A shows a plan view of an absorbent paper sheet 21 that has parallel slits of a predetermined width 19 cut through it, forming strips of paper 23. Sheet 21 is then creased along the fold lines 22. In the preferred construction of this embodiment, sheet 21 is a plurality of thicknesses of newspaper sheets.

Figure 2B:
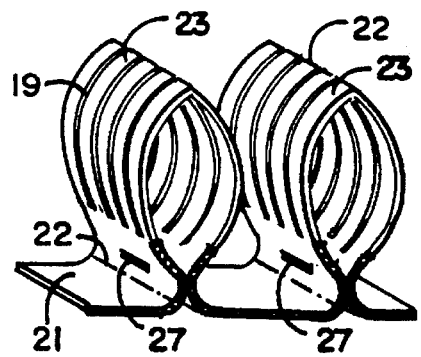
FIG. 2B shows a sectional detail of the slit absorbent sheet material after folding and attaching but prior to cutting to free the ends of the paper strips.

FIG. 2B is an isometric projected section of a small portion of an absorbent paper sheet 21 illustrating two paper loops. Sheet 21 is shown folded and secured by an absorbent material attachment means 27 to form upright closed loops of strips of absorbent paper 23. Preferred attachment means 27 are metal staples, although stitching with a thin line of twisted fiber, either in spots or continuously, will work equally well as will the use of punching and the utilization of paper tabs or other fasteners.

Figure 2C:
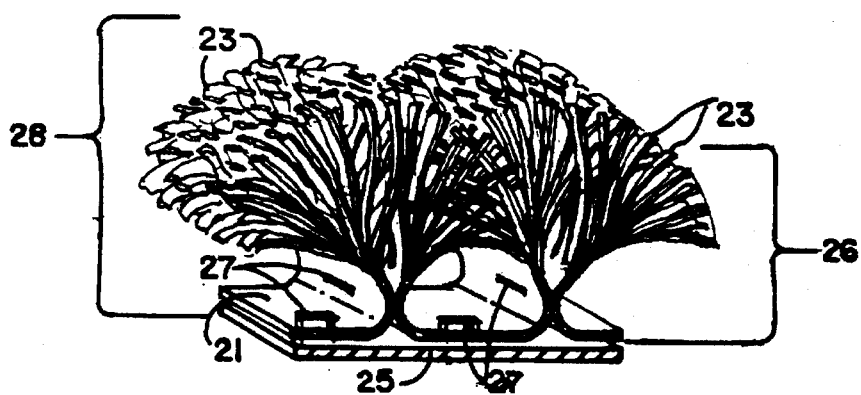
FIG. 2C shows a detail of the final geometry after the absorbent strips are cut.

In FIG. 2C, the upright loops of a paper sheet are cut at the apex to free the ends of paper strips 23, which are then agitated to form the final geometry. Although a pet toilet absorbent pad 26 thus formed is self supporting and may be utilized alone, in this embodiment the pad is attached to an absorbent base sheet 25 with a plurality of absorbent material attachment means 27 to give it more rigidity. In the preferred construction of this embodiment, absorbent base sheet 25 is a plurality of sheets of newspaper. Together, absorbent pad 26 and base sheet 25 comprise a pet toilet absorbent pad assembly 28. The final geometry of the interlaced paper strips 23 create many intersections and the resulting arching caused by edge friction at these intersections and their substantially upright orientation causes the overall surface to have support for the animal and resilient memory. This feature is common to both this embodiment and the alternate embodiments shown in figures series 3, 4, 6, and 7. It is obvious that many additional alternate geometries and fabrication methods are possible.

FIG. 2D shows a sectional detail of the components shown in FIGS. 2A through 2C comprising a pet toilet absorbent pad 26 combined with an absorbent base sheet 25 which is turned up at the edges and secured at the corners by an attachment means 27 (see FIG. 1B for overall view), thus forming a pet toilet absorbent pad assembly 28. When absorbent sheet 25 is turned up at the corners, the angle and curvature can be adjusted by the placement of attachment means 27 so that a reasonably tight fit can be achieved. Assembly 28 is then secured to a liquid impermeable membrane liner 29 by an attachment means 37, which in the illustrated embodiment is an adhesive which is spot applied at predetermined intervals. Alternate means of attachment 37 include mechanical fasteners such as staples or rivets, or attachment can be accomplished by stitching with a thin line of twisted fiber. The impermeable liner 29, in its preferred embodiment, is a sheet of biodegradable plastic of a predetermined thickness and strength which is fabricated larger than a conventional litter box 41 and is restrained from moving by an elastic cord 30 which is wrapped under the lip of litter box 41. Alternate means of attachment could include using a drawstring or elastic shrinkage such as suggested in U.S. Pat. No. 4,869,204 Yananton, September 1989, or simply tucking the excess liner 29 under the litter box, and allowing the tight fit of turned up absorbent sheet 25 to hold it in place.

FIG. 2E shows a section of an embodiment similar to 2D, but the toilet is used without a litter box as a portable unit for travelling and a liquid impermeable liner 29 is attached to a supporting surface 43 by an attachment means 39 which, in the preferred embodiment, would be a pressure sensitive tape with peel off face located at predetermined intervals. In the illustration, an absorbent base sheet 25 is shown without having the edge turned up. Alternatively, the absorbent base sheet 25 could be turned up without the utilization of a litter box 41 shown in FIG. 1D.

Figure 3A:
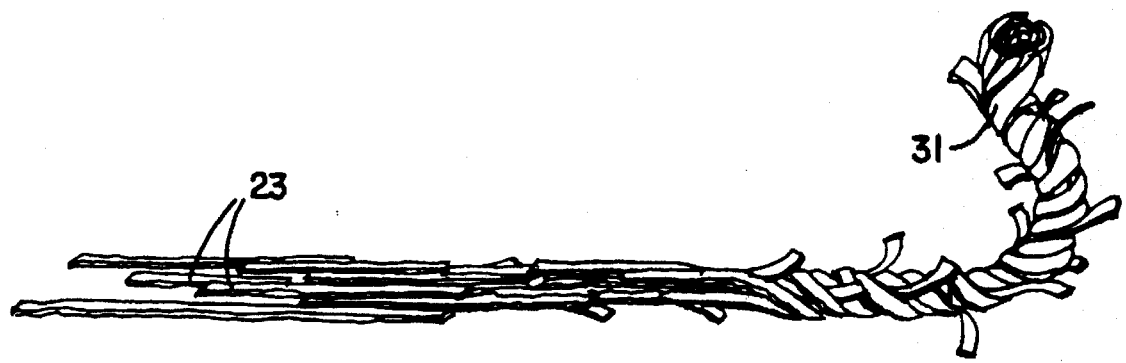
FIG. 3A shows an alternate embodiment in which strips of an absorbent material are first woven into a continuous strand.
Figure 3B:
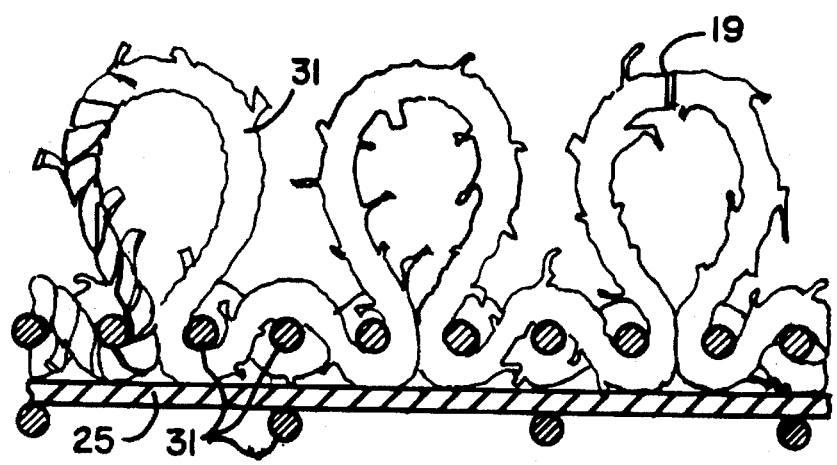
FIG. 3B shows a detail of the final assembly of the alternate embodiment in which the strands are woven to a substrate but prior to cutting.
Figure 3C:
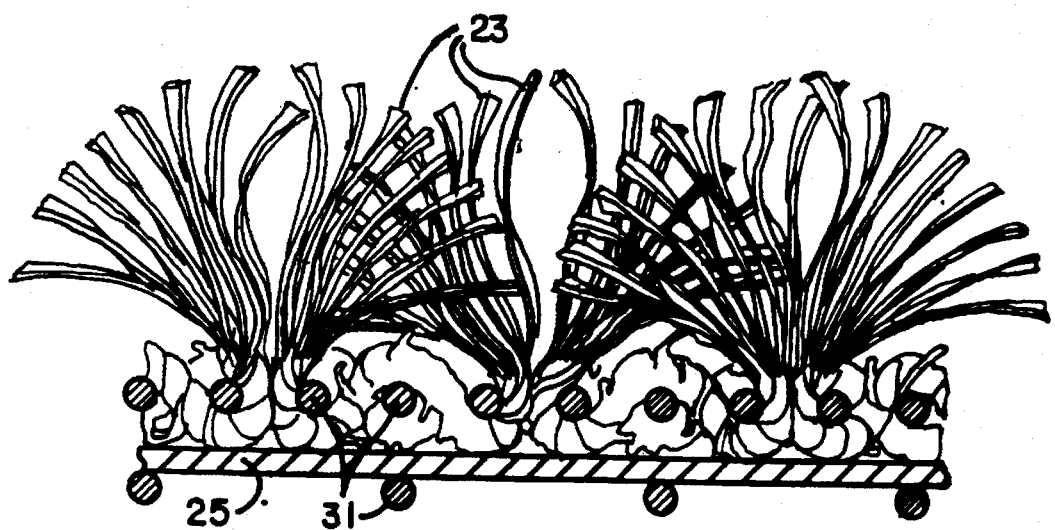
FIG. 3C shows a detail of the final assembly of the alternate embodiment shown in FIG. 3B after the strands are cut and final geometry achieved.

FIGS. 3A, 3B, and 3C illustrate an alternate embodiment of the pet toilet absorbent pad of the present invention which fabricates paper strips into paper strands or ropes which are then secured together to create the pet toilet absorbent pad. FIG. 3A shows a plurality of strips of paper of a predetermined length and width 23 which are oriented in a parallel direction and then twisted into a continuous rope or strand 31. The method of fabrication for doing this are those of carding, spinning and other processes commonly used to weave twisted fibre strands of natural materials such as cotton or wool except that strips 23 and strands 31 are much larger in size. The friction developed along the cut edges of the strips is similar to that developed with natural fibers utilized for making cloth and holds them in place without adhesive. In the preferred embodiment, strips 23 are strips of shredded newspaper.

FIG. 3B shows a detailed cross section of the alternate embodiment of the pet toilet absorbent pad of the present invention in which the absorbent strand 31 illustrated in FIG. 2A is woven into large loops which are threaded through a woven base sheet comprised, in the preferred embodiment, of other absorbent strands 31 of a similar or smaller diameter woven in both directions.

FIG. 3C shows the final geometry of the structure after the loops are cut and the strips of paper 23 are agitated to achieve a grasslike texture. Alternate methods of attachment of the strands 31 to an absorbent base sheet 25 could include weaving or tying with a thin line of twisted fiber or utilizing adhesive. These fabrication methods are commonly used to manufacture cut pile carpets, and suede or fur like fabrics, except that the size of the components in the present invention are larger in scale.

Figure 4A:
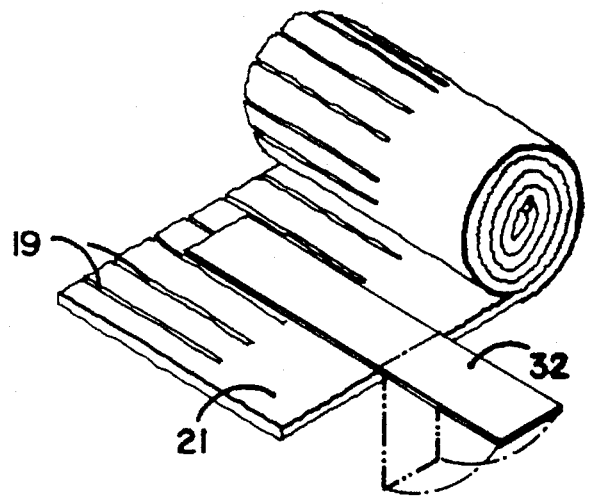
FIG. 4A shows a detail of a portion of the partially slit absorbent sheet material used to fabricate tufts of an alternate embodiment further illustrated in detail in FIGS. 4B and 4C.
Figure 4B:
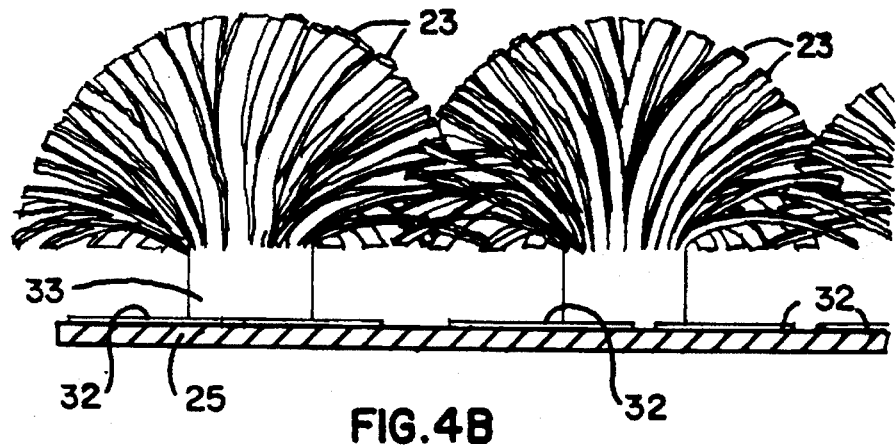
FIG. 4B shows a sectional detail of the tuft and a means of assembly to an absorbent base sheet.
Figure 4C:
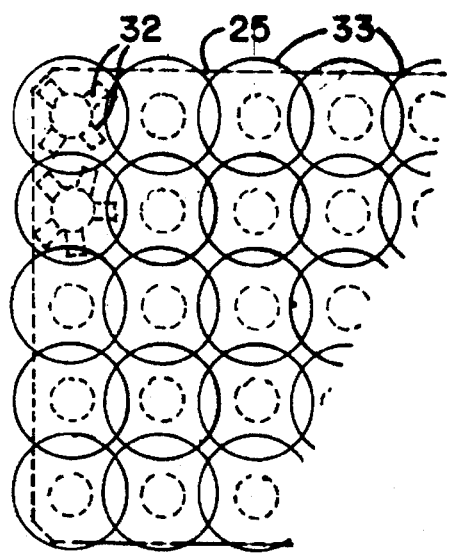
FIG. 4C shows a plan of the tufts seen in FIG. 4A, arranged to create an absorbent pad.

FIGS. 4A, 4B and 4C show yet another alternate embodiment of the pet toilet absorbent pad of the present invention which fabricates partially slit paper into tufts 33 which are then secured to an absorbent base sheet 25. FIG. 4A shows a sheet of paper 21 which has slits 19 at the top margin. The paper 21 is then rolled in a cylindrical shape to form a tuft 33 which is shown in FIG. 4B. A plurality of paper tabs 32 are rolled into the cylinder to form an attachment to the absorbent base sheet 25 which is shown in FIG. 4B.

FIG. 4B shows a detailed elevation of a tuft 33 which, by crushing down and agitating, spreads the free ends of the strips of paper into a soft grasslike texture and creates the arching effect required for support and resiliency. In the illustrated embodiment, the tuft 33 is attached to an absorbent base sheet 25 by paper tabs 32 which are secured by adhesive. Alternative means of attaching tabs 32 could include mechanical devices such as staples or rivets or the utilization of a thin line of twisted fiber to stitch tab 32 onto the backing. Alternatively tuft 33 could be attached directly to absorbent base sheet 25 by punching holes in base sheet 25 of similar diameter as tufts 33 and inserting and securing tufts 33 with adhesive to the absorbent base sheet 25, thus obviating the need for paper tabs 32.

FIG. 4C shows a partial plan view of a pet toilet absorbent pad assembly 26 (see FIG. 4B) comprised of an orthogonal array of tufts 33 attached to an absorbent base sheet 25 by paper tabs 32. Alternative geometric arrays and numbers of tufts to achieve the required effect and overlap are many and the plan shows only one of these possible arrangements.

Figure 5A:
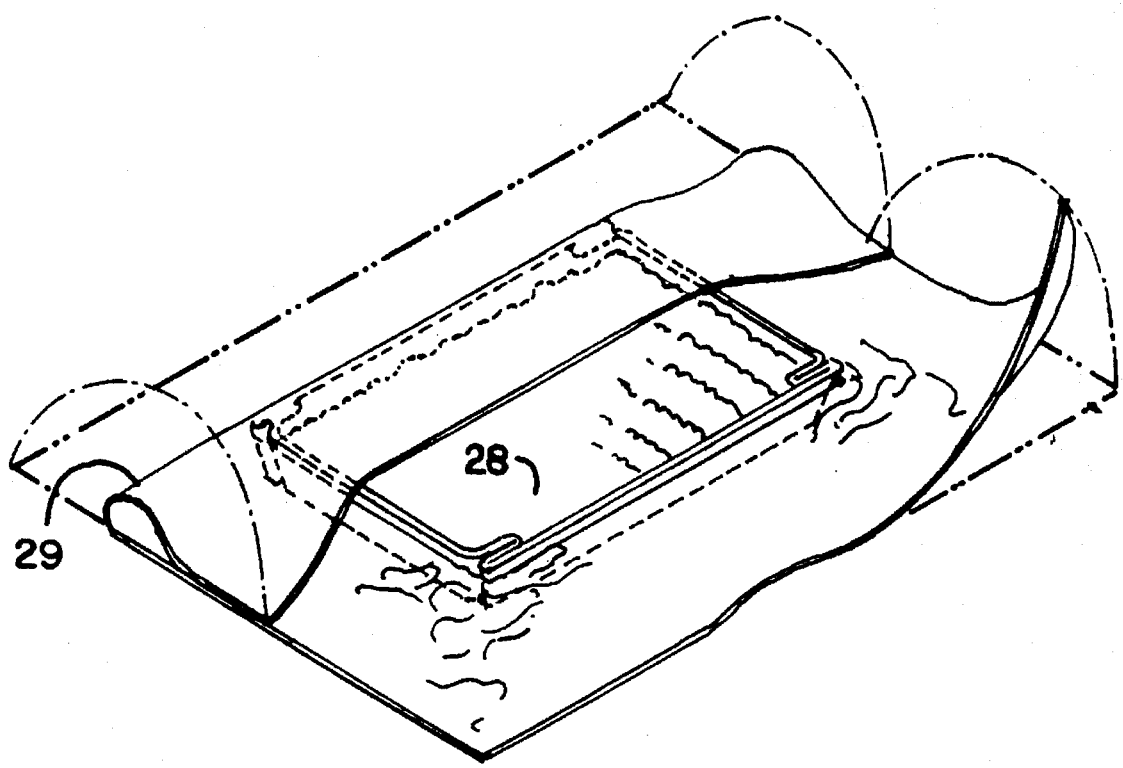
FIG. 5A shows the folding of a liquid impermeable membrane over a pet toilet absorbent pad or absorbent pad assembly for disposal.
Figure 5B:
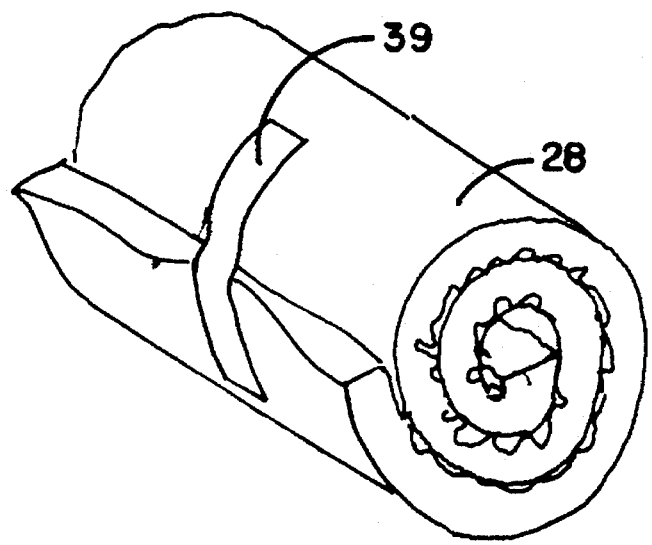
FIG. 5B shows a pet toilet absorbent pad or absorbent pad assembly rolled up inside a liquid impermeable membrane for disposal.

FIG. 5A shows a liquid impermeable membrane 29 partially folded over a pet toilet absorbent pad assembly 28 for disposal. After the sides are folded over, the ends would then be folded or vice versa. FIG. 5B shows the folded package rolled up in the folded liquid impermeable membrane liner and secured with an attachment means 39 into an easily disposable compact package. In the preferred embodiment the attachment means 39 would be a single or predetermined number of strips of pressure sensitive adhesive tape with a peel-off facing.

FIGS. 6A through 6L show an embodiment in which the tuft is comprised of a linear assembly of loose shredded absorbent material and absorbent sheets. In the preferred embodiment, the absorbent strips are random lengths of shredded newsprint, and the absorbent base sheet 25 is multiple layers of newsprint. This embodiment is designed to be fabricated on a continuous and linear high volume production line. FIGS. 6A through 6D show the basic steps in the fabrication of this embodiment.

Figure 6A:
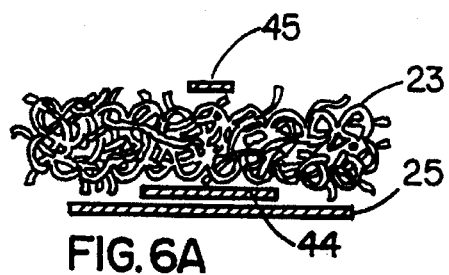

FIG. 6A shows the arrangement of the components in a transverse section across a single tuft portion of an assembly line; in the preferred means of fabrication, the production line would be many parallel rows of tufts being assembled at one time. Components 25, 45, and 44 in the preferred means of manufacture would be sheets of absorbent materials on rolls which would be unwound and laid in the configuration as shown. The absorbent base sheet 25, however could be fabricated of multiple sheets of recycled newsprint which could be laid and lapped on the production line platform. The strips of absorbent material 23 would be laid in a bed of predetermined thickness; in the preferred embodiment the strips 23 would be random length or predetermined length shredded newsprint.

Figure 6B:
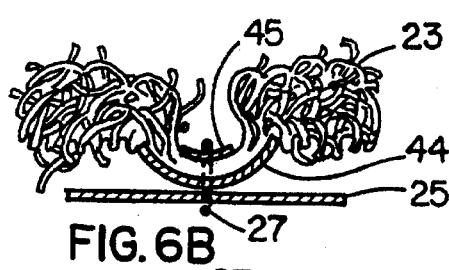

FIG. 6B shows the first step in production, namely, the compression of the strips 23 by the inside tuft restraint 45 and by the use of absorbent material attachment means 27 its attachment to the base sheet 25. The absorbent material attachment means 27 could be metal staples, rivets, clips or any similar device; in the preferred embodiment this attachment would be stitched continually with twine or thread using a sewing machine technique. Note that the outside tuft restraint 44 is being partially elevated by guides along the production line (not shown) to its fully formed profile as shown in FIG. 6C.

Figure 6C:
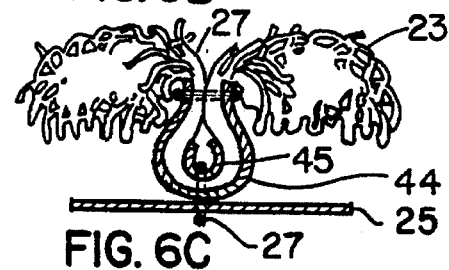

FIG. 6C shows the tuft in its final profile formed by absorbent material attachment means 27 at the free ends of the outside tuft restraint 44.

Figure 6D:
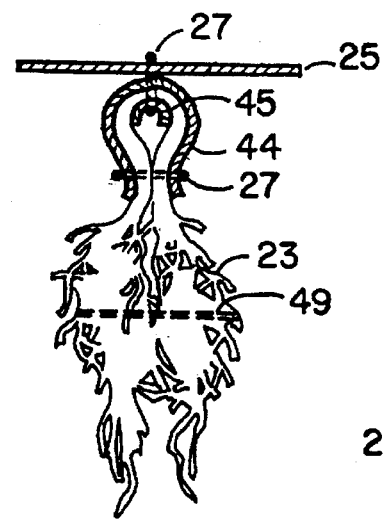

FIG. 6D shows the tuft inverted on the assembly line. The tuft would be agitated in this position to free any unattached strips 23 which were retrained in the tangle; then the tuft would be trimmed 49. The trimmings would be collected and recycled back to the bed of absorbent strips 23 illustrated in step 6A.

Figure 6F:
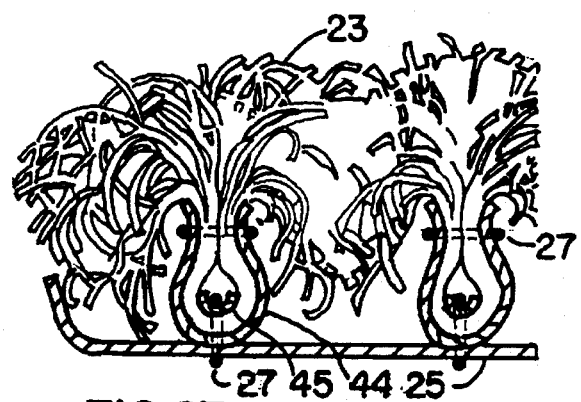
Figure 6G:
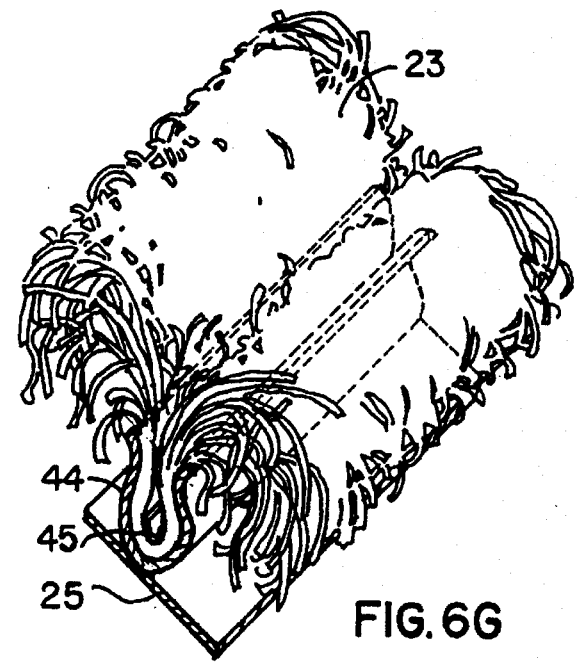
Figure 6E:
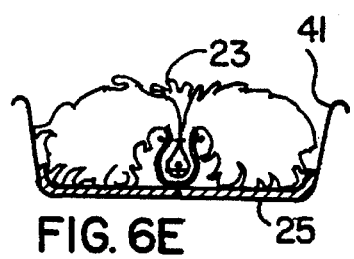

FIG. 6E shows the installation of the pet toilet absorbent pad assembly as fabricated by steps 6A to 6D in the form of a single large tuft installed in a conventional litter box 41. Although the preferred embodiment is a multiplicity of tufts, the single tuft array provides the most resilient form of this embodiment. Other tuft arrangements are discussed in more detail in the description related to FIGS. 6H, 6J, 6K, and 6L.

FIG. 6F shows a cross section of a small portion of this absorbent pad embodiment with a multiplicity of tufts; the absorbent base sheet 25 is sized slightly larger than the bottom of a litter box so that the edge turns up to absorb urine which is deposited on the side of the box. FIGS. 6J and 6L show how this profile relates to a conventional litter box, 41.

FIG. 6G shows and isometric of a short portion of a single tuft along with attached base sheet 25 to show the linear nature of the assembly.

Figure 6H:
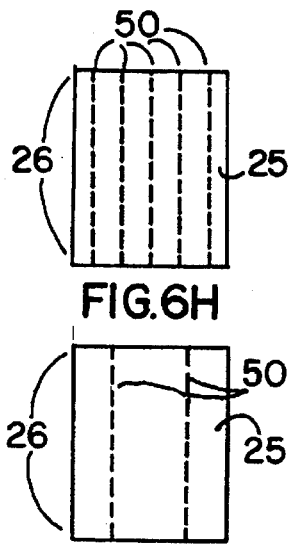
Figure 6K:
Figure 6J:
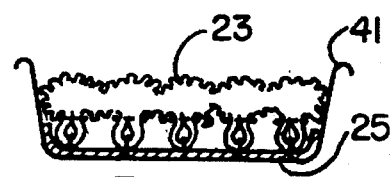
Figure 6L:
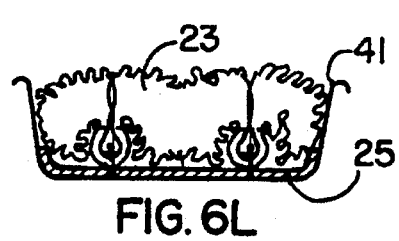

FIG. 6H shows a plan of a pet toilet absorbent pad 26 comprised of 5 rows of bundled strips 50 and an absorbent base sheet 25; FIG. 6J show a cross section of this array in a conventional litter box, 41. FIG. 6K shows a plan of a pet toilet absorbent pad 26 comprised of 2 rows of bundled strips 50 and an absorbent base sheet 25; FIG. 6L shows a cross section of this array in a conventional litter box 41. Many arrays are possible and only a few are shown. The rigidity of the pad is increased as the number of tufts increases, the spacing between tufts is reduced, and the tufts are trimmed shorter in the fabrication process. The resiliency of the pad is increased by reducing the number of tufts, increasing their spacing, and trimming them longer.

FIGS. 7A through 7J shows another embodiment of a disposable pet toilet unit according to the present invention. This embodiment may be manufactured quite inexpensively on a continuous production line, and is fabricated from loose shredded absorbent material and absorbent sheets. In this embodiment, the preferable absorbent strips 23 are random lengths of shredded newsprint, and the absorbent base sheet is a compressible simple or compound base sheet.

Figure 7A:
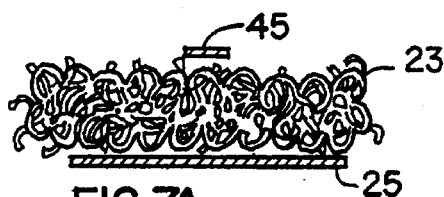
Figure 7B:

FIGS. 7A and 7B show the assembly of a single tuft's components for an embodiment with a single absorbent base sheet 25 of predetermined thickness. As the thickness and compressibility of the base sheet 25 increases, more upward bias is imparted to the shredded absorbent material whereby the individual strips assume a more vertical orientation. The illustration shows a base sheet 25 that is thin and only minimally compressed to show the extreme limit of this effect.

FIG. 7A is similar to the cross section of the production line for a single tuft shown in FIG. 6A. FIG. 7A shows the simplest configuration for this embodiment—a single thickness of compressible absorbent base sheet 25 upon which a plurality of loose strips of absorbent material 23 are attached via a restraint 45. After attachment of the absorbent strips 23, the ends of the strips are trimmed to a desired length, as shown in FIG. 7F.

FIG. 7B shows the first step in production where the restraint 45 is tightly secured with attachment means 27 to the absorbent base sheet 25, which compression causes an upward bias to the absorbent strips 23, creating resiliency in the strips.

FIGS. 7C through 7J show an embodiment with a compound base sheet comprised of a permeable top sheet 47, a bottom sheet 48, and a compressible absorbent stuffing 51 between sheets 47 and 48. This embodiment allows the omission of the outside tuft restraint 44 as shown in the embodiment illustrated in FIGS. 6A through 6L, as the compressible base sheet acts to elevate the shredded tuft material. FIGS. 7A through 7F show the basic steps in the manufacture of this embodiment.

The permeable top sheet 47 may be manufactured from any sheet of material strong enough to contain the stuffing 51. This permeable top sheet 47 may be, for example, a single sheet of perforated or slit water-impermeable membrane, a plurality of such sheets, or an absorbent sheet that is porous, perforated or slit. In the preferred embodiment sheet 47 would be a multiplicity of sheets of perforated or slit newsprint.

The compressible absorbent stuffing 51 may be, for example, a non-woven absorbent paper pad, particulate absorbent material (either organic or inorganic), or strips or crumpled sheets of absorbent material. A wide variety of sizes, types and mixtures of absorbent material may be employed. The absorbent material can be chemically treated with deodorants, germicidal agents, etc. Strips 23 may be treated with the same or different chemical agents, including deodorants and germicidal agents. In the preferred embodiment, this stuffing 51 would be shredded newsprint.

The bottom sheet 48 may be, for example, a layer of absorbent material if the toilet pad assembly also included a liquid impermeable membrane liner 29 (see FIG. 7G), or the bottom sheet itself could be the liquid impermeable membrane liner 29 and the separate bottom absorbent sheet omitted. In the preferred embodiment the bottom sheet 48 is a multiplicity of sheets of newsprint.

Figure 7C:
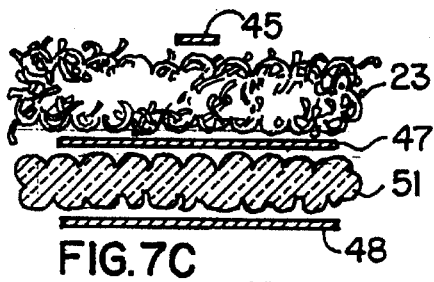

FIG. 7C shows a cross section of the arrangement of elements on a continuous production line for this embodiment which includes a compound absorbent base sheet comprised of a permeable top sheet 47, a compressible absorbent stuffing 51, and a bottom sheet 48. Other components include absorbent strips 23 and an inside tuft restraint 45.

Figure 7D:
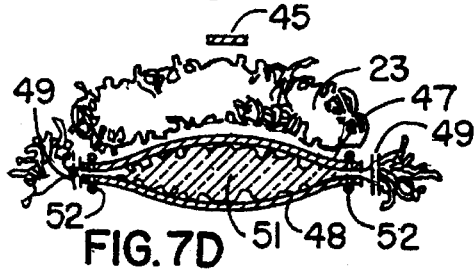

FIG. 7D shows the first step in fabrication where the permeable top sheet 47 is secured by attachment means 52 to the bottom sheet 48 and the compressible stuffing which protrudes is trimmed off at cut 49. In a production line of multiple tufts, the composite base sheet would be cut only between pads and the stuffing would become part of the stuffing of the adjacent pad.

Figure 7G:
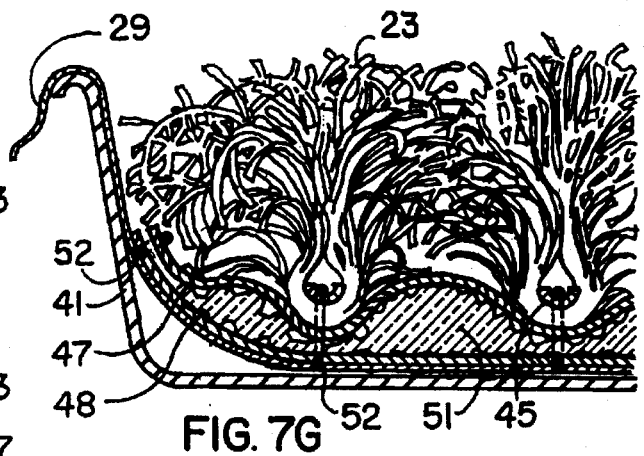
Figure 7E:
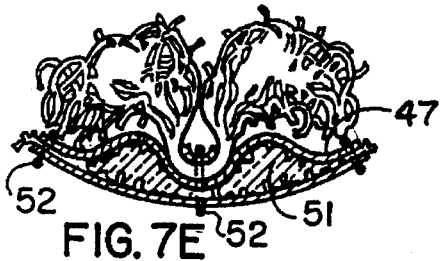

FIG. 7E shows the attachment of the absorbent strips 23 through all three layers of the absorbent base sheet by attachment means 52. The profile caused by this attachment reveals one of the purposes of this embodiment—the compressible stuffing 51 holds the strips 23 upright, eliminating the need for the outside tuft restraint 44 shown in the embodiment illustrated in the FIG. 6 series of drawings, and simultaneously pulls up the outer edges of the base sheet to generate a tight fit by compression at the edge of a conventional litter box (See FIG. 7G, 41) thereby exposing a highly absorbent edge for urine running down the side of the box.

FIG. 7F shows the tuft inverted. The tuft would be agitated in this position to free any unattached strips 23 retrained in the tangle; then the tuft would be trimmed at cut 49. The trimmings would be collected and recycled back to the bed of absorbent strips 23 illustrated in step 7C.

FIG. 7G shows a partial section of a complete pet toilet absorbent pad assembly with a multiple tuft variation of the embodiment. Included is a separate liquid impermeable membrane 29 which can take the form of a sheet or bag, and can be restrained by an elastic cord 30 as shown in FIG. 2D. This section also shows how the oversize assembly of top sheet 47 absorbent stuffing 51 and bottom sheet 48 which together have an upward bias, fit tightly to a conventional litter box 41 at the edge of the pad.

Figure 7H:
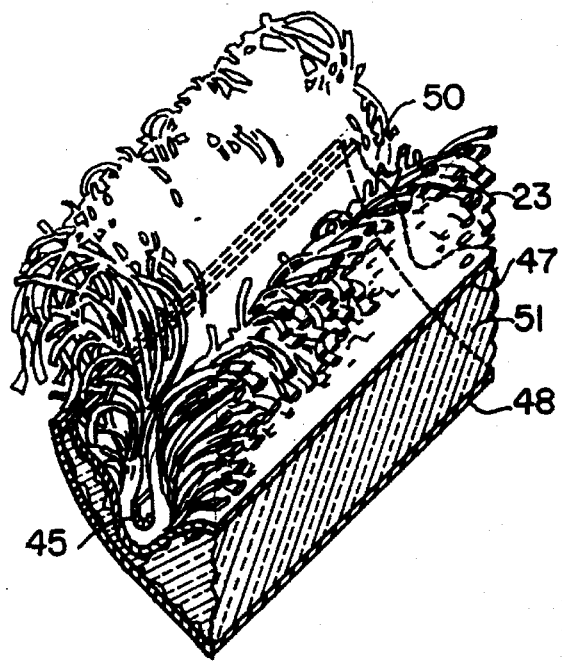
Figure 7F:
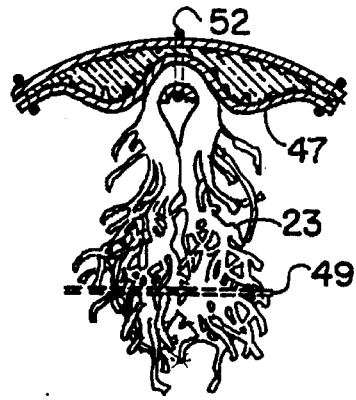

FIG. 7H shows a short section of a single tuft of bundled absorbent strips 23 along with the other components of this embodiment as described in the descriptions of previous figures.

Figure 7J:
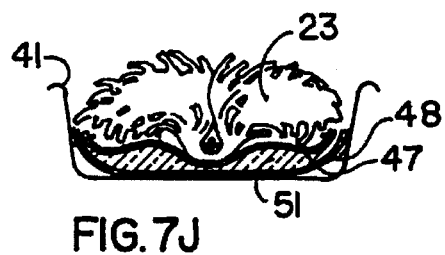

FIG. 7J shows the installation of the pet toilet absorbent pad assembly as fabricated by steps 7C to 7F in the form of a single large tuft installed in a conventional litter box 41. Although the preferred array is a multiplicity of tufts, the single tuft array provides the most resilient form of this embodiment. Alternate tuft arrangements such as those shown in FIGS. 6H, 6J, 6K, and 6L are also applicable to this embodiment.

OPERATION

FIGS. 1A, 1B, 2D, 2E, 5A, and 5B

In the embodiments where the a pet toilet absorbent pad assembly 28 is used in conjunction with a conventional litter box 41, the pet toilet complete with a liquid impermeable membrane liner 29 is simply inserted into litter box 41, with liquid impermeable membrane liner 29 hanging over all four edges (FIGS. 1A & 7G). An elastic cord 30 is then stretched over the rim of the litter box 41 to secure the pet toilet (FIG. 2D). In an alternate embodiment, in which the pet toilet is utilized without litter box 41 (FIGS. 1B and 2E), liquid impermeable membrane liner 29 is simply stretched out and taped to a supporting surface 43 by an attachment means 39 which, in the preferred embodiment, would be pressure sensitive adhesive tape with a peel off surface. The latter configuration catches any feces that may be kicked out of the pet toilet and prevents the soiling of the surrounding floor or supporting surface. After the pet toilet is soiled, liquid impermeable membrane liner 29 is folded over (FIG. 5A) and then rolled up and secured (FIG. 5B) for disposal. Alternatively a water impermeable bag may be used for liner and disposal.

From the description above, a number of advantages of my pet toilet become evident:

(a) By securing the absorbent material strips upright and agitating them an arched fabrication is created which utilizes the compression resistance along the longitudinal axis of the strip in combination with the friction developed along the sheared strip edge to create a soft and resilient grass like texture which is attractive to animals as it satisfies the burying instinct with just enough firmness to be easy to walk on. The burying/ digging actions of the animal actually agitates the strips and makes them fluffier and more attractive.

(b) By securing the strips upright, the strips that are soaked with urine dry rapidly because of the constant aeration around each fiber. This rapid drying, combined with the natural deodorizers of carbon black in the preferred embodiment of recycled newspapers tends to dissipate odor rapidly.

(c) By attaching the strips upright in folds or tufts, voids to trap the heavier and drier solids are created beneath them while the wetter semi-solid feces are trapped between the strips and, thus suspended, dry rapidly.

(d) By attaching the strips upright in folds or tufts, they are resistant to the tangling, matting, caking and compression of litter made of randomly laid absorbent strips or natural materials as they are used and walked upon by animals.

(e) By attachment of the strips into a one piece portable toilet, an assembly is created which cannot be scattered by an animal, is light in weight, easy to carry and deploy, and easy to dispose of.

(f) By cutting naturally absorbent material into strips, the absorbency and exposed surface for wetting and drying are maximized and the required amount of absorbent material can be minimized creating a lightweight and economical product.

(g) By combining an absorbent pad with a liquid impermeable membrane liner, an assembly is created that eliminates all cleaning related to the pet toilet. Whether used in conjunction with a conventional litter box or by itself, the pet toilet is simply disposed of as a small quantity of trash after it is used by the animal.

(h) By the elimination of pelletized litter the problem of dust creation, animal scattering, lack of portability, infection, and the requirement of a heavy liquid impermeable liner are all simultaneously eliminated.

Although the description above contains many specifics and the present invention is shown in a number of embodiments, these should not be construed as limiting the scope of the invention but merely providing illustrations of some of the presently preferred embodiments of this invention. For example, the strips could be attached at the middle with both ends free, bundled or arrayed in various folds and configurations to achieve the same result, the strips could be longer and cut finer to become almost a fur-like texture, coarser, shorter, and closely spaced to become stiffer, etc. Thus the scope of the invention should be determined by the appended claims and their legal equivalents, rather than by the examples given.

I claim:

1. A pet toilet absorbent pad comprising a plurality of individual flexible and resilient strips of absorbent material secured to a resilient base sheet, said strips being secured to said base sheet so that an end region of a portion of the strips stands substantially freely upright, said plurality of strips being secured at selected locations on the base sheet whereby individual strips touch and develop discontinuous frictional support for one another.

2. A pet toilet absorbent pad according to claim 1 wherein said strips of absorbent material are comprised of paper.

3. A pet toilet absorbent pad according to claim 1 wherein said base sheet comprises a compressible absorbent material disposed between a liquid-permeable top sheet and a bottom sheet.

4. A pet toilet absorbent pad according to claim 3 wherein said liquid-permeable top sheet is paper.

5. A pet toilet absorbent pad according to claim 3 wherein said liquid-permeable top sheet is slit paper.

6. A pet toilet absorbent pad according to claim 3 wherein said liquid-permeable top sheet is perforated paper.

7. A pet toilet absorbent pad according to claim 3 wherein said bottom sheet comprises an absorbent material.

8. A pet toilet absorbent pad according to claim 3 wherein said bottom sheet comprises a liquid-impermeable material.

9. A pet toilet absorbent pad according to claim 3 wherein said compressible absorbent material is comprised of shredded paper.

10. A pet toilet absorbent pad according to claim 3 wherein said compressible absorbent material is a particulate absorbent material.

11. A pet toilet absorbent pad according to claim 3 wherein said compressible absorbent material comprises a crumpled paper sheet.

12. A pet toilet absorbent pad according to claim 3 wherein said compressible absorbent material is comprised of a nonwoven paper sheet.

13. A pet toilet absorbent pad according to claim 3 wherein said compressible absorbent material is comprised of a loose filling of noncompressible particulate matter.

14. A pet toilet absorbent pad according to claim 3, further including a liquid impermeable membrane with a length and width greater than the length and width of the absorbent pad, disposed on a lower surface of said base sheet.

15. A pet toilet absorbent pad according to claim 14, wherein said liquid impermeable membrane further comprises attachment means, disposed at an edge portion of the membrane, for securing the membrane around the absorbent pad after soiling by a pet.

16. A pet toilet absorbent pad according to claim 1, further including a liquid impermeable membrane with a length and width greater than the length and width of the absorbent pad, disposed on a lower surface of said base sheet.

17. A pet toilet absorbent pad according to claim 16, wherein said liquid impermeable membrane further comprises attachment means, disposed at an edge portion of the membrane, for securing the membrane around the absorbent pad after soiling by a pet.

* * * * *